United States Patent
Ott et al.

(10) Patent No.: US 6,514,470 B1
(45) Date of Patent: Feb. 4, 2003

(54) CATALYSTS FOR LEAN BURN ENGINE EXHAUST ABATEMENT

(75) Inventors: Kevin C. Ott, Los Alamos, NM (US); Noline C. Clark, Jemez Springs, NM (US); Mark T. Paffett, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/699,162

(22) Filed: Oct. 27, 2000

Related U.S. Application Data

(60) Provisional application No. 60/162,431, filed on Oct. 28, 1999.

(51) Int. Cl.⁷ .............................................. C01B 21/20
(52) U.S. Cl. .............................. 423/239.1; 423/239.2; 423/213.2; 423/213.5
(58) Field of Search ............................. 423/212, 213.5, 423/239.1, 239.2, 213.2

(56) References Cited

U.S. PATENT DOCUMENTS

| | | | | |
|---|---|---|---|---|
| 4,016,245 A | | 4/1977 | Plank et al. | 423/328 |
| 4,046,685 A | | 9/1977 | Bray | 210/23 H |
| 5,118,483 A | | 6/1992 | Barri | 423/328 |
| 5,171,553 A | | 12/1992 | Li et al. | 423/239 |
| 5,260,043 A | * | 11/1993 | Li et al. | 423/212 |
| 5,358,916 A | | 10/1994 | Shiokawa et al. | 502/65 |
| 5,407,651 A | * | 4/1995 | Kawai | 423/212 |
| 5,427,753 A | * | 6/1995 | Miura et al. | 423/239.2 |
| 5,443,803 A | | 6/1995 | Mizuno et al. | 423/213.2 |
| 5,433,933 A | * | 7/1995 | Eshita et al. | 423/213.2 |
| 5,449,504 A | | 9/1995 | Kasahara et al. | 423/239.2 |
| 5,451,385 A | * | 9/1995 | Hansel et al. | 423/213.2 |
| 5,695,728 A | * | 12/1997 | Miura et al. | 423/239.2 |
| 5,776,423 A | * | 7/1998 | Feeley et al. | 423/213.5 |
| 5,807,528 A | * | 9/1998 | Nakano et al. | 423/213.2 |
| 5,834,395 A | | 11/1998 | Honda | 502/346 |
| 5,869,013 A | * | 2/1999 | Tabata et al. | 423/213.2 |
| 5,935,529 A | | 8/1999 | Saito et al. | 422/177 |
| 5,968,462 A | | 10/1999 | Suzuki | 423/213.2 |
| 5,968,463 A | | 10/1999 | Shelef et al. | 423/213.5 |
| 5,968,466 A | * | 10/1999 | Kharas | 423/213.2 |
| 5,985,225 A | | 11/1999 | Ohtsuka et al. | 423/239.2 |
| 5,993,764 A | | 11/1999 | Tabata et al. | 423/239.2 |
| 6,010,673 A | | 1/2000 | Kanazawa et al. | 423/213.5 |
| 6,063,351 A | | 5/2000 | Hamon et al. | 423/239.2 |
| 6,074,976 A | | 6/2000 | Tabata et al. | 502/74 |

* cited by examiner

Primary Examiner—Stanley S. Silverman
Assistant Examiner—Christina Ildebrando
(74) Attorney, Agent, or Firm—Bruce H. Cottrell

(57) ABSTRACT

The present invention provides a process for catalytically reducing nitrogen oxides in an exhaust gas stream containing nitrogen oxides and a reductant material by contacting the gas stream under conditions effective to catalytically reduce the nitrogen oxides with a catalyst comprising a aluminum-silicate type material and a minor amount of a metal, the catalyst characterized as having sufficient catalytic activity so as to reduce the nitrogen oxides by at least 60 percent under temperatures within the range of from about 200° C. to about 400° C.

7 Claims, 6 Drawing Sheets

CATALYSTS FOR LEAN BURN ENGINE EXHAUST ABATEMENT

BENEFIT OF PRIOR APPLICATION

This application claims the benefit of the filing date of U.S. Provisional Application 60/162,431, filed Oct. 28, 1999.

FIELD OF THE INVENTION

The present invention relates to catalysts for lean burn engine exhaust abatement and to processes for preparation of such catalysts. This invention was made with government support under Contract No. W-7405-ENG-36 awarded by the U.S. Department of Energy. The government has certain rights in the invention.

BACKGROUND OF THE INVENTION

Removal of $NO_x$ from exhaust streams is a critical technology for the automotive and electric power industry in meeting ever more stringent air emissions standards. In view of future emissions standards automotive companies have focused on the design of lean-burn engine designs where the combustion fuel to air ratio is substantially less than the stoichiometric ratio used in present day engines. Under lean burn conditions, the existing catalytic converter technology does not work. Thus, new catalytic converters must be developed for lean burn engine technology to be implemented. Lean burn $deNO_x$ catalysts are highly sought after and are the focus of considerable research worldwide. A rather narrow window of satisfactory operating temperatures has characterized most catalysts for lean burn applications. Specifically, they only effectively convert $NO_x$ over small temperature ranges that do not always match the temperatures at which the $NO_x$ is emitted. Some of the better catalyst materials have included metal-substituted zeolite catalysts such as Cu-ZSM-5 and related catalysts consisting of various zeolites with metal ions substituted into the zeolite structure. These materials offer activity at higher temperatures than conventional platinum-based $deNO_x$ catalysts, but the best operating temperature ranges are generally too high (above about 400° C.) and too narrow (only about 100° C. in effective range width).

In addition, internal combustion engines emit a large amount of unburned hydrocarbons during cold engine start-up. In fact, a rather large fraction of the total emitted hydrocarbons released during the first minutes of engine operation are due to the uncombusted hydrocarbons in the rich fuel mixture. Such release of hydrocarbons after engine start-up poses a special problem, as at that point the temperatures of the exhaust gas and the catalytic converter are generally not high enough for conversion of the gaseous pollutants by conventional catalysts. The catalysts in present catalytic converter systems are generally ineffective at ambient temperatures and must reach high temperatures, often in the range of 300° C. to 400° C. before they become effective.

For example, U.S. Pat. No. 5,171,553 describes the catalytic decomposition of $N_2O$ from gaseous mixtures, but conversion or decomposition rates of 50 percent of the $N_2O$ are shown as requiring temperatures of greater than about 275° C. as shown in their FIG. 3 for rhodium-exchanged zeolites and of greater than about 350° C. as shown in their FIGS. 1 and 2 for copper- and cobalt-exchanged zeolites.

U.S. Pat. No. 5,776,423 describes the catalytic decomposition of $NO_x$ gaseous mixtures, but shows conversion or decomposition rates of less than 50 percent of the $NO_x$ at temperatures of less than about 375° C. even before aging of the catalyst as shown in their FIG. 1.

Numerous other patents such as U.S. Pat. No. 5,935,529, U.S. Pat. No. 5,869,013, U.S. Pat. No. 5,834,395, U.S. Pat. No. 5,695,728, U.S. Pat. No. 5,449,504, U.S. Pat. No. 5,443,803, U.S. Pat. No. 5,427,753, U.S. Pat. No. 5,358,916, U.S. Pat. No. 5,260,043, and U.S. Pat. No. 5,171,553, either describe the problems of treating exhaust gases at temperatures below 300° C. to 400° C. or fail to show conversion rates of 50 percent or more at temperatures below about 300° C. to 400° C.

Catalysts have now been found which overcome these obstacles and provide for effective $NO_x$ conversion at lower temperatures and a wider temperature range.

It is an object of this invention to provide a process for $NO_x$ conversion in an exhaust stream under temperature conditions of from about 200° C. to about 600° C.

Another object of this invention is a process for $NO_x$ conversion of at least about 60 percent in an exhaust stream under temperature conditions of from about 200° C. to about 600° C., especially from about 200° C. to about 400° C.

Yet another object of the present invention is to provide for $NO_x$ conversion in an exhaust stream with a broad effective operating range, i.e., a high conversion rate such as at least about 60 percent for a temperature range of greater than 200° C., preferably greater than 300° C.

Still another object of the present invention is to provide compositions of matter useful for the catalytic reduction of nitrogen oxides in an exhaust stream under temperature conditions of from about 200° C. to about 600° C., especially from about 200° C. to about 400° C.

SUMMARY OF THE INVENTION

To achieve the foregoing and other objects, and in accordance with the purposes of the present invention, as embodied and broadly described herein, provides a process for catalytically reducing nitrogen oxides in an exhaust gas stream containing nitrogen oxides and a reductant material including contacting said gas stream under conditions effective to catalytically reduce said nitrogen oxides with a catalyst comprising a aluminum-silicate type material and a minor amount of a metal, said catalyst characterized as having sufficient catalytic activity so as to reduce the nitrogen oxides by at least 60 percent under temperatures within the range of from about 200° C. to about 400° C.

The present invention further provides a composition of matter, useful in a process for catalytically reducing nitrogen oxides in an exhaust gas stream containing nitrogen oxides and a reductant material, comprising a ferrierite material having undergone a pretreatment by contact with a dilute solution of a material selected from the group consisting of ammonium fluoride, ammonium nitrate, ammonium chloride, nitric acid, hydrochloric acid, hydrofluoric and oxalic acid for a sufficient period of time to allow for catalytically reducing nitrogen oxides in an exhaust gas stream containing nitrogen oxides and a reductant material by at least 60 percent under temperatures within the range of from about 200° C. to about 600° C. Such pretreatment is conducted for ferrierite material obtained from Tosoh Corporation whereas no pretreatment is conducted for ferrierite material obtained from Zeolyst Corp.

DETAILED DESCRIPTION

Figure 1A:
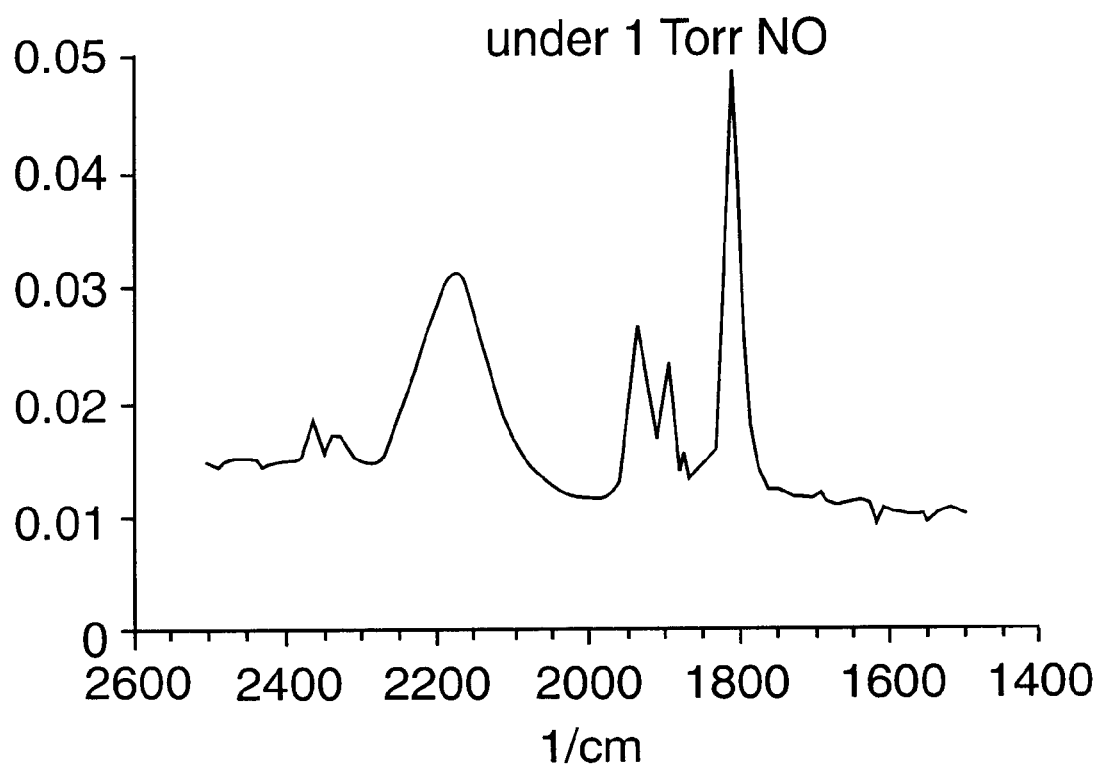
FIG. 1 (a–f) show NO and CO adsorption data collected by IR with (a) and (b) each being the spectra for prior art composition of Hansel (U.S. Pat. No. 5,524,432) and (c), (d), (e) and (f) being the spectra for materials of the present invention.

The present invention is concerned with a process for catalytically reducing nitrogen oxides in an exhaust gas stream containing nitrogen oxides and a reductant material, e.g., hydrocarbons. The present invention is also concerned with compositions of matter useful in a process for catalytically reducing nitrogen oxides in an exhaust gas stream containing nitrogen oxides and hydrocarbons.

The term "$NO_x$" as used herein refers to nitrogen oxides and includes both nitrogen monoxide and nitrogen dioxide. The term "hydrocarbons" as used herein refers to not only hydrocarbons in a narrow sense but also partially oxidized products thereof such as oxygenated hydrocarbons, for example, alcohols and ketones.

Exhaust Gases

The exhaust gases which can be treated in the catalytic system of the present invention can come from the combustion of fuels in automotive engines, gas turbines, engines using an oxygen-rich mixture (lean-burn conditions), and power stations. The fuels can be, e.g., natural gas, gasoline, LPG, kerosene, heavy oil and coal. The exhaust gases typically include $NO_x$ and $O_2$ as well as $SO_x$, CO, $CO_2$, $H_2$, $H_2O$ and hydrocarbons including methane and other lower hydrocarbons.

In performance testing of the catalysts and processes of the present invention, a simulated exhaust gas mixture was used. The simulated exhaust gas mixture included 75 ppm NO, 600 ppm HC (as $C_1$), 600 ppm CO, 200 ppm $H_2$, 12 percent $O_2$, 5 percent $CO_2$, with the remainder $N_2$. Optional simulated exhaust gas mixture could further include 5 percent $H_2O$ in the mixture and/or 1.5 to 15 ppm $SO_2$. The hydrocarbon (HC) is typically a propylene/propane mixture (1:1 mole ratio) although a mixture of propylene/octane mixture (1:1 mole ratio) may be used as well. Those skilled in the art will readily recognize that other variations of such simulated exhaust gas mixtures could be employed. For example, the hydrocarbon is generally present as a reductant material and can be replaced by other suitable reductant materials such as ammonia and the like.

Process Conditions

The exhaust gas is typically treated in the catalytic system of this invention at a temperature of from about 150° C. to about 900° C. or more, preferably at a temperature of from about 200° C. to about 650° C., and at a gas hourly space velocity, GHSV, (volumes of gas at STP per volume of catalyst per hour) adjusted to provide the desired conversion.

The GHSV can be from about 1000 to about 500,000 hr$^{-1}$, preferably within the range of from about 2500 to about 250,000 hr$^{-1}$. The process of this invention is operable at subatmospheric to superatmospheric pressure, e.g., at from about 5 psia to about 500 psia, preferably from about 10 psia to about 50 psia, i.e., near or slightly above atmospheric pressure.

Adequate conversion may be readily achieved with a simple stationary fixed-bed of catalyst. However, other contacting means are also contemplated, such as contacting with a fluid bed, a transport bed, and a monolithic structure such as a honeycomb.

Catalyst Composition

Catalysts useful in this invention typically comprise small pore aluminosilicate zeolites whether naturally occurring or synthetic crystalline zeolites. Such zeolites further include a minor amount of a metal added to the zeolite framework. The preferred zeolites are related as being members of the family of 10-ring/8-ring zeolites that contain 10-ring pore openings with 8-ring side pockets or intersecting channels. Specific examples of these zeolites include ferrierite (FER) including ZSM-35 (U.S. Pat. No. 4,016,245), cobalt-gallium-phosphate-5 (CGF), cobalt-gallium-phosphate-6 (CGS), dachiardite (DAC), epistilbite (EPI), heulandite (HEU), ZSM-57 (U.S. Pat. No. 4,046,685) (MFS), stilbite (STI), wenkite (WEN), and weinebeneite (WEI) and other framework topologies such as SUZ-4 as described in U.S. Pat. No. 5,118,483. The three letter designations for the zeolites is in accordance with the IUPAC rules on Zeolite nomenclature, see, "Chemical Nomenclature and Formulation of Compositions of Synthetic and Natural Zeolites", R. M. Barrer, Pure and Applied Chemistry, vol. 51, pp. 1091–1100 (1979). The family of 12-ring/8-ring zeolites may be used as well and includes SAPO-40 (AFR), MAPSO-46 (AFS), CoAPO-50 (AFY), beryllophosphate-H (BPH), gmelinite (GME), mazzite (MAZ), mordenite (MOR), and offretite (OFF). These zeolites and their isotypes are described in "Atlas of Zeolite Structure Types", eds. W. H. Meier, D. H. Olson and Ch. Baerlocher, Elsevier, 4th Edition, 1996, which is hereby incorporated by reference. Among the preferred catalysts are included ferrierite materials (FER) such as that supplied by Tosoh Corporation as product number # HSZ-720KOA (lot # 5001 with a silica to alumina ratio of 17.7 mol/mol) and such as that supplied by Zeolyst Corp. as product # CP914B-20 (lot # 52D with a silica to alumina ratio of 15.7 mol/mol).

Catalyst Pre-treatment

The ferrierite material can be pre-treated by washing or soaking in a dilute ammonium fluoride solution at temperatures of from about 10° C. to about 50° C., preferably from about 20° C. to about 35° C. for from about 2 hours to about 96 hours, preferably from about 4 hours to about 60 hours. Treatment with the selected pre-wash can be repeated with fresh wash solution for an additional period of time from about 2 hours to about 96 hours, preferably from about 4 hours to about 60 hours. Treatment at temperatures of as high as 60° C. have been found to yield poor catalytic performance in the conversion of $NO_x$. The dilute ammonium fluoride solution can typically be from about 0.01 Molar (M) to about 2 M, preferably from about 0.05 M to about 1 M. Other solutions than ammonium fluoride may be used, e.g., solutions of ammonium nitrate, ammonium chloride, hydrochloric acid, nitric acid, hydrofluoric acid, oxalic acid and the like, although dilute solutions of ammonium fluoride are preferred. It has been found especially beneficial to pretreat ferrierite material obtained from Tosoh Corp. as product number # HSZ-720KOA (lot # 5001 with a silica to alumina ratio of 17.7 mol/mol) with the ammonium fluoride pretreatment. In contrast, some ferrierite materials such as product # CP914B-20 (lot # 52D with a silica to alumina ratio of 15.7 mol/mol) obtained from Zeolyst Corp. have been found (after suitable metal loading) to exhibit high catalytic conversion rates at low temperatures without any such pretreatment. Both materials, i.e., the Tosoh ferrierite with the above pretreatment and the Zeolyst ferrierite without pretreatment, were found to exhibit surprisingly exceptional $NO_x$ conversion rates at catalyst temperatures as low as about 200° C. to about 300° C. or even lower.

Metal Treatment

After any desired pre-treatment, the ferrierite materials are generally calcined by heating at temperatures from about 450° C. to about 650° C. for from about 2 hours to about 10 hours. While not wishing to be bound by the present explanation, it is believed that such a calcination is generally preferred as it converts ammonium ions to hydrogen ions in the zeolite pore structure. Surprisingly, it has been found that calcination was not needed with Tosoh ferrierite material when the added metal is either gallium or indium although calcination is necessary for the same ferrierite material when the added metal is only cobalt.

Following calcination, the ferrierite is treated with a metal salt to enhance the catalytic performance. The metal salt can generally include any transition metal or other non-alkali metal or non-alkaline earth metal or combination of such metals as is well know to those of skill in the art. Among the preferred metal salts are a cobalt salt, a gallium salt, an indium salt, a manganese salt or a zinc salt. The loading of the cobalt metal upon a zeolite catalyst material such as a ferrierite material can be readily accomplished by an aqueous exchange process. A dilute aqueous solution of a metal salt is added to the ferrierite material and stirred for a desired amount of time. The metal solution is centrifuged off, changed if desired, and the addition, stirring, and centrifuging repeated. The zeolite is rinsed with deionized water and dried at 110° C. Optionally, a solid state exchange process may be used. A volatile metal halide is ground in a mortar and pestle with ferrierite material, heated under a vacuum to between about 500° C. and about 700° C. for from about 1 hour to about 12 hours, washed with deionized water and dried, e.g., at 110° C. Typical metal loading levels range from as low as about 0.02 weight percent to as high as about 2.0 weight percent or higher, based on total weight of metal and zeolite material. Higher metal loadings may be used but are generally not beneficial. With Tosoh ferrierite material, metal loadings nearer to the top of the range from 0.02 to 2 weight percent have been found preferable. With Zeolyst ferrierite material, metal loadings less than about 0.1 weight percent have been found preferable. $N_2O$:

An additional advantage of these materials is that they do not catalyze the formation of $N_2O$ (nitrous oxide) from the exhaust gas mixture. Other more conventional lean $NO_x$ catalysts, particularly those containing platinum group metals, are known to form copious amounts of nitrous oxide. Other Metals, and Combinations:

Other metal ions in addition to Co have been shown to be active for $NO_x$ catalysis in FER. For example, Mn-exchanged ferrierite can be prepared that has similar activity to the best Co ferrierite catalysts described here. Also, Ga-exchanged ferrierite and In-exchanged ferrierite can be prepared that have similar activity to the Co ferierite catalysts described here. Other metal ions including Fe, Ni, Cu, Cr, and Ag can also lead to active ferrierite catalysts. It is well known in the field of catalysis that there are often synergistic effects of adding additional metal ion components to a catalyst, or by exchanging multiple metal ions into a catalyst to improve catalytic performance. In this regard, the combination of metal ions such as Ga and In in addition to those listed above can be added to the Co catalyst to modify the catalytic performance of the ferrierite catalysts.

Combinations of Co and Ga, Co and In, and Co, Ga and In have demonstrated high catalytic activity with a broad temperature window. Other metals and combinations will be readily apparent to those skilled in the art.

Catalysts for reduction of $NO_x$ levels in exhaust gases need to have high activity and high temperature stability in the presence of both oxygen and water vapor.

Evaluation of catalytic activity was as follows. Catalytic material was sieved into 20–30 mesh particle size. 1 cc (ca. 0.5 g) of material was placed into a quartz tube reactor and supported with a coarse quartz frit. A simulated gas exhaust mixture having the composition NO=75 ppm, HC 600 ppm (1:1 propylene:propane for screening—see above for other variations), CO=600ppm, $H_2$=200ppm, $O_2$=12%, and $CO_2$=5% was passed through the reactor at a flow rate of approximately 400 milliliters/minute (25,000 $h^{-1}$ of GHSV (gas hourly space velocity)). The gas mixture was delivered by blending 3 mixes through mass flow controllers (MFC) at equal rates, totaling about 400 milliliters/minute; MFC 1=$H_2$, propylene, propane in $N_2$; MFC 2=NO in $N_2$; MFC 3=CO, $CO_2$, $O_2$ in $N_2$. The catalyst bed was heated to approximately 300° C. under the $CO/CO_2/O_2$ mixture. The remaining two mixtures were turned on, and the reactor was heated to 600° C. and held for 20 minutes. Starting at 600° C., the temperature was ramped down and held at various desired temperatures (50° C. increments) for 20 minutes each down to 100° C. Conversion data points were collected every minute.

The compositions of matter of the present invention have been evaluated or tested under the above conditions and have exhibited higher $NO_x$ conversion levels than an exemplary prior art composition tested in the same manner. While numerous prior patents have often tested for $NO_x$ conversion under widely varying conditions, the compositions of matter of the present invention exhibit high $NO_x$ conversion levels of generally at least about 60 percent at temperatures from 200° C. to 400° C. under the above specified test conditions.

While not wishing to be bound by the present explanation, it is believed that the activity of the small pore aluminosilicate catalysts described here exhibit unusually high activity over a broad temperature range because of the adsorption properties of small pore zeolites. These adsorption properties lead to the ability to store both hydrocarbons and $NO_x$ at low temperatures (at or below about 200° C.), and then to release them at higher temperatures (at or above around 150° C.) where catalytic conversion of the $NO_x$ and hydrocarbons may take place in the usual manner. The hydrocarbon adsorption properties also lend a mechanism to control the catalytic combustion of the hydrocarbons, and provide for a much wider temperature range over which catalytic combustion may occur. In turn, the broad range of catalytic combustion of the hydrocarbons means that the unburned hydrocarbons may be available in their role as a reductant for $NO_x$ over a much broader range than a conventional catalyst. The tailoring of the hydrocarbon and $NO_x$ adsorption properties by choosing and tailoring the topological and chemical properties of small pore zeolites allows for optimization of the temperature of operation and the temperature range of catalytic activity of the catalyst.

The present invention is more particularly described in the following examples, which are intended as illustrative only, since numerous modifications and variations will be apparent to those skilled in the art. The ferrierite material in the examples was supplied by either Tosoh Corporation as product number # HSZ-720KOA (lot # 5001 with a silica to alumina ratio of 17.7 mol/mol) or Zeolyst Corp. as product # CP914B-20 (lot # 52D with a silica to alumina ratio of 15.7 mol/mol).

EXAMPLE 1

Approximately 5 grams of Tosoh ferrierite material was added to 200 mL of a 0.01M cobalt (II) acetate solution and stirred for 24 hours at room temperature. The mixture was centrifuged, the supernatant was discarded, and another 200 mL portion of the cobalt (II) acetate solution was added to the ferrierite. This mixture was stirred for 24 hours at room temperature, then centrifuged, and the supernatant was again discarded. The cobalt-exchanged ferrierite was then washed with a series of three aliquots of deionized water and dried at 110° C. overnight.

EXAMPLE 2

Approximately 10 grams of Tosoh ferrierite was added to 100 mL of a 0.1M ammonium fluoride solution. The mixture was stirred for 24 hours at room temperature. The mixture was then centrifuged and the supernatant was discarded. The ferrierite was then washed with a series of three aliquots of deionized water and dried at 110° C. overnight. The dried ferrierite material was finally calcined under flowing dry air for 10 hours at 600° C. Approximately 4.2 grams of the calcined ferrierite material was added to 200 mL of a 0.01M cobalt (II) acetate solution and stirred for 24 hours at room temperature. The mixture was centrifuged, the supernatant was discarded, and another 200 mL portion of the cobalt (II) acetate solution was added to the ferrierite. This mixture was stirred for 24 hours at room temperature, then centrifuged, and the supernatant was again discarded. The cobalt-exchanged ferrierite was then washed with a series of three aliquots of deionized water and dried at 110° C. overnight. Elemental analysis of the cobalt-exchanged ferrierite material showed that the content of cobalt was 0.23 weight percent based on the total weight of cobalt-exchanged ferrierite material. The ratio of Si:Al was analyzed as 9.4 and the ratio of Al:Co was analyzed as 36.8.

EXAMPLE 3

Approximately 22 grams of Tosoh ferrierite was added to 250 mL of a 0.1M ammonium fluoride solution. The mixture was stirred for 24 hours at room temperature. The mixture was then centrifuged, the supernatant was discarded, and another 200 mL portion of the ammonium fluoride solution was added to the ferrierite. This mixture was stirred for another 24 hours at room temperature, then centrifuged, and the supernatant was again discarded. The ferrierite was then washed with a series of three aliquots of deionized water and dried at 110° C. overnight. The dried ferrierite material was finally calcined under flowing dry air for 10 hours at 600° C. Approximately 5 grams of the calcined ferrierite material was added to 200 mL of a 0.01M cobalt (II) acetate solution and stirred for 48 hours at room temperature. The mixture was centrifuged, the supernatant was discarded, and another 200 mL portion of the cobalt (II) acetate solution was added to the ferrierite. This mixture was stirred for 72 hours at room temperature, then centrifuged, and the supernatant was again discarded. The cobalt-exchanged ferrierite was then washed with a series of three aliquots of deionized water and dried at 110° C. overnight. Elemental analysis of the cobalt-exchanged ferrierite material showed that the content of cobalt was 0.43 weight percent based on the total weight of cobalt-exchanged ferrierite material. The ratio of Si:Al was analyzed as 9.2 and the ratio of Al:Co was analyzed as 19.8.

EXAMPLE 4

Approximately 20 grams of Tosoh ferrierite was added to 200 mL of a 0.1M ammonium fluoride solution. The mixture was stirred for 24 hours at room temperature. The mixture was then centrifuged, the supernatant was discarded, and another 200 mL portion of the ammonium fluoride solution was added to the ferrierite. This mixture was stirred for another 24 hours at room temperature, then centrifuged, and the supernatant was again discarded. The ferrierite was then washed with a series of three aliquots of deionized water and dried at 110° C. overnight. The dried ferrierite material was finally calcined under flowing dry air for 6 hours at 600° C. Approximately 5 grams of the calcined ferrierite material was added to 250 mL of a 0.01M cobalt (II) acetate solution and stirred for 48 hours at room temperature. The mixture was centrifuged, the supernatant was discarded, and another 250 mL portion of the cobalt (II) acetate solution was added to the ferrierite. This mixture was stirred for 72 hours at room temperature, then centrifuged, and the supernatant was again discarded. The cobalt-exchanged ferrierite was then washed with a series of three aliquots of deionized water and dried at 110° C. overnight. The dried cobalt ferrierite material was finally calcined under flowing dry air for 6 hours at 600° C. Elemental analysis of the cobalt-exchanged ferrierite material showed that the content of cobalt was 1.01 weight percent based on the total weight of cobalt-exchanged ferrierite material. The ratio of Si:Al was analyzed as 8.7 and the ratio of Al:Co was analyzed as 7.9.

EXAMPLE 5

Approximately 22 grams of Tosoh ferrierite was added to 250 mL of a 0.1M ammonium fluoride solution. The mixture was stirred for 24 hours at room temperature. The mixture was then centrifuged, the supernatant was discarded, and another 250 mL portion of the ammonium fluoride solution was added to the ferrierite. This mixture was stirred for another 24 hours at room temperature, then centrifuged, and the supernatant was again discarded. The ferrierite was then washed with a series of three aliquots of deionized water and dried at 110° C. overnight. The dried ferrierite material was finally calcined under flowing dry air for 10 hours at 600° C. Approximately 5 grams of the calcined ferrierite material was added to 200 mL of a 0.01M cobalt (II) acetate solution and stirred for 24 hours at 60±2° C. The mixture was centrifuged, the supernatant was discarded, and another 200 mL portion of the cobalt (II) acetate solution was added to the ferrierite. This mixture was stirred for 24 hours at 60±2° C., then centrifuged, and the supernatant was again discarded. The cobalt-exchanged ferrierite was then washed with a series of three aliquots of deionized water and dried at 110° C. overnight. Elemental analysis of the cobalt-exchanged ferrierite material showed that the content of cobalt was 1.33 weight percent based on the total weight of cobalt-exchanged ferrierite material. The ratio of Si:Al was analyzed as 9.1 and the ratio of Al:Co was analyzed as 6.5.

EXAMPLE 6

Approximately 10 grams of Tosoh ferrierite was added to 100 mL of a 0.1M ammonium fluoride solution. The mixture was stirred for 24 hours at 60±5° C. The mixture was then centrifuged, the supernatant was discarded, and another 100 mL portion of the ammonium fluoride solution was added to the ferrierite. This mixture was stirred for another 24 hours at 60±5° C., then centrifuged, and the supernatant was again discarded. The ferrierite was then washed with a series of three aliquots of deionized water and dried at 110° C. overnight. The dried ferrierite material was finally calcined under flowing dry air for 10 hours at 600° C. Approximately 4.5 grams of the calcined ferrierite material was added to 200 mL of a 0.01M cobalt (II) acetate solution and stirred for 24 hours at room temperature. The mixture was centrifuged, the supernatant was discarded, and another 200 mL portion of the cobalt (II) acetate solution was added to the ferrierite. This mixture was stirred for 24 hours at room temperature, then centrifuged, and the supernatant was again discarded. The cobalt-exchanged ferrierite was then washed with a series of three aliquots of deionized water and dried at 110° C. overnight. Elemental analysis of the cobalt-exchanged ferrierite material showed that the content of cobalt was 0.24 weight percent based on the total weight of cobalt-exchanged ferrierite material. The ratio of Si:Al was analyzed as 9.5 and the ratio of Al:Co was analyzed as 35.0.

EXAMPLE 7

Approximately 10 grams of Tosoh ferrierite was added to 100 mL of a 0.1M ammonium fluoride solution. The mixture was stirred for 24 hours at 60±5° C. The mixture was then centrifuged, the supernatant was discarded, and another 100 mL portion of the ammonium fluoride solution was added to the ferrierite. This mixture was stirred for another 24 hours at 60±5° C., then centrifuged, and the supernatant was again discarded. The ferrierite was then washed with a series of three aliquots of deionized water and dried at 110° C. overnight. The dried ferrierite material was finally calcined under flowing dry air for 10 hours at 600° C. Approximately 4 grams of the calcined ferrierite material was added to 200 mL of a 0.01M cobalt (II) acetate solution and stirred for 24 hours at 60±2° C. The mixture was centrifuged, the supernatant was discarded, and another 200 mL portion of the cobalt (II) acetate solution was added to the ferrierite. This mixture was stirred for 24 hours at 60±2° C., then centrifuged, and the supernatant was again discarded. The cobalt-exchanged ferrierite was then washed with a series of three aliquots of deionized water and dried at 110° C. overnight. Elemental analysis of the cobalt-exchanged ferrierite material showed that the content of cobalt was 1.4 weight percent based on the total weight of cobalt-exchanged ferrierite material. The ratio of Si:Al was analyzed as 9.8 and the ratio of Al:Co was analyzed as 5.8.

discarded. The cobalt-exchanged ferrierite was then washed with a series of three aliquots of deionized water and dried at 110° C. overnight. Elemental analysis of the cobalt-exchanged ferrierite material showed that the content of cobalt was 0.061 weight percent based on the total weight of cobalt-exchanged ferrierite material. The ratio of Si:Al was analyzed as 9.4 and the ratio of Al:Co was analyzed as 124.5.

EXAMPLE 9

Approximately 5 grams of Zeolyst ferrierite material was added to 200 mL of a 0.01M manganese (II) acetate solution and stirred for 24 hours at room temperature. The mixture was centrifuged, the supernatant was discarded, and another 200 mL portion of the manganese (II) acetate solution was added to the ferrierite. This mixture was stirred for 24 hours at room temperature, then centrifuged, and the supernatant was again discarded. The manganese-exchanged ferrierite was then washed with a series of three aliquots of deionized water and dried at 110° C. overnight. Elemental analysis of the cobalt-exchanged ferrierite material showed that the content of cobalt was 0.077 weight percent based on the total weight of cobalt-exchanged ferrierite material. The ratio of Si:Al was analyzed as 9.8 and the ratio of Al:Co was analyzed as 91.8.

EXAMPLE 10

Approximately 22 grams of Zeolyst ferrierite was added to 250 mL of a 0.1M ammonium fluoride solution. The

TABLE 1

Percentage of $NO_x$ conversion at various catalyst temperatures for Tosoh ferrierite versus variations in cobalt composition, pre-treatment conditions and cobalt exchange conditions. The pre-treatment was two washes with 0.1M ammonium fluoride at room temperature, and the cobalt treatment was two exchanges with 0.01M cobalt acetate at room temperature, unless otherwise noted.

|  | 200° C. | 250° C. | 300° C. | 350° C. | 400° C. | 450° C. | Varied Conditions and Cobalt Composition |
|---|---|---|---|---|---|---|---|
| Run 1 | 12 | 25 | 35 | 27 | 45 | 50 | No pre-treatment |
| Run 2 | 92 | 100 | 95 | 85 | 72 | 52 | (0.23 wt % Co) |
| Run 3 | 95 | 98 | 95 | 85 | 80 | 75 | (0.43 wt % Co) |
| Run 4 | 75 | 95 | 100 | 98 | 95 | 100 | (1.01 wt % Co) |
| Run 5 | 45 | 65 | 85 | 92 | 95 | 98 | 60° C. Co exchange (1.33 wt % Co) |
| Run 6 | 92 | 95 | 95 | 82 | 70 | 58 | 60° C. NH$_4$F washes (0.24 wt % Co) |
| Run 7 | 40 | 55 | 50 | 30 | 40 | 75 | 60° C. NH$_4$F washes and 60° C. Co exchange (1.4 wt % Co) |

The results of Table 1 indicate that increasing the cobalt loading up to about 1 weight percent broadens $NO_x$ conversion to a wider temperature range. Run 7 in comparison to run 5 shows that higher temperature pre-treatment washes with ammonium fluoride were not not beneficial to $NO_x$ conversion.

EXAMPLE 8

Approximately 5 grams of Zeolyst ferrierite material was added to 200 mL of a 0.01M cobalt (II) acetate solution and stirred for 24 hours at room temperature. The mixture was centrifuged, the supernatant was discarded, and another 200 mL portion of the cobalt (II) acetate solution was added to the ferrierite. This mixture was stirred for 24 hours at room temperature, then centrifuged, and the supernatant was again mixture was stirred for 24 hours at room temperature. The mixture was then centrifuged, the supernatant was discarded, and another 250 mL portion of the ammonium fluoride solution was added to the ferrierite. This mixture was stirred for another 24 hours at room temperature, then centrifuged, and the supernatant was again discarded. The ferrierite was then washed with a series of three aliquots of deionized water and dried at 110° C. overnight. The dried ferrierite material was finally calcined under flowing dry air for 10 hours at 600° C. Approximately 5 grams of the calcined ferrierite material was added to 200 mL of a 0.01M cobalt (II) acetate solution and stirred for 24 hours at room temperature. The mixture was centrifuged, the supernatant was discarded, and another 200 mL portion of the cobalt (II) acetate solution was added to the ferrierite. This mixture was stirred for 24 hours at room temperature, then centrifuged, and the supernatant was again discarded. The cobalt-exchanged ferrierite was then washed with a series of three aliquots of deionized water and dried at 110° C. overnight. Elemental analysis of the cobalt-exchanged ferrierite material showed that the content of cobalt was 0.023 weight percent based on the total weight of cobalt-exchanged ferrierite material. The ratio of Si:Al was analyzed as 10.5 and the ratio of Al:Co was analyzed as 339.8.

EXAMPLE 11

Approximately 5 grams of Zeolyst ferrierite material was added to 200 mL of a 0.01M cobalt (II) acetate solution and stirred for 24 hours at 60±2° C. The mixture was centrifuged, the supernatant was discarded, and another 200 mL portion of the cobalt (II) acetate solution was added to the ferrierite. This mixture was stirred for 24 hours at 60±2° C., then centrifuged, and the supernatant was again discarded. The cobalt-exchanged ferrierite was then washed with a series of three aliquots of deionized water and dried at 110° C. overnight.

EXAMPLE 12

Approximately 10 grams of Zeolyst ferrierite was added to 100 mL of a 0.1M ammonium fluoride solution. The mixture was stirred for 24 hours at 60±2° C. The mixture was then centrifuged, the supernatant was discarded, and another 100 mL portion of the ammonium fluoride solution was added to the ferrierite. This mixture was stirred for another 24 hours at 60±2° C., then centrifuged, and the supernatant was again discarded. The ferrierite was then washed with a series of three aliquots of deionized water and dried at 110° C. overnight. Approximately 4.5 grams of the ferrierite material was added to 200 mL of a 0.01M cobalt (II) acetate solution and stirred for 24 hours at room temperature. The mixture was centrifuged, the supernatant was discarded, and another 200 mL portion of the cobalt (II) acetate solution was added to the ferrierite. This mixture was stirred for 24 hours at room temperature, then centrifuged, and the supernatant was again discarded. The cobalt-exchanged ferrierite was then washed with a series of three aliquots of deionized water and dried at 110° C. overnight. Elemental analysis of the cobalt-exchanged ferrierite material showed that the content of cobalt was 0.095 weight percent based on the total weight of cobalt-exchanged ferrierite material. The ratio of Si:Al was analyzed as 11.3 and the ratio of Al:Co was analyzed as 83.4.

EXAMPLE 13

Approximately 10 grams of Zeolyst ferrierite was added to 100 mL of a 0.1M ammonium fluoride solution. The mixture was stirred for 24 hours at 60±2° C. The mixture was then centrifuged, the supernatant was discarded, and another 100 mL portion of the ammonium fluoride solution was added to the ferrierite. This mixture was stirred for another 24 hours at 60±2° C., then centrifuged, and the supernatant was again discarded. The ferrierite was then washed with a series of three aliquots of deionized water and dried at 110° C. overnight. Approximately 5 grams of the ferrierite material was added to 200 mL of a 0.01M cobalt (II) acetate solution and stirred for 24 hours at 60±2° C. The mixture was centrifuged, the supernatant was discarded, and another 200 mL portion of the cobalt (II) acetate solution was added to the ferrierite. This mixture was stirred for 24 hours at 60±2° C., then centrifuged, and the supernatant was again discarded. The cobalt-exchanged ferrierite was then washed with a series of three aliquots of deionized water and dried at 110° C. overnight. Elemental analysis of the cobalt-exchanged ferrierite material showed that the content of cobalt was 0.29 weight percent based on the total weight of cobalt-exchanged ferrierite material. The ratio of Si:Al was analyzed as 11.9 and the ratio of Al:Co was analyzed as 24.7.

EXAMPLE 14

Approximately 5 grams of Zeolyst ferrierite was mixed with approximately 0.5 gram of cobalt (II) iodide with a mortar and pestle. This mixture was placed into a quartz tube and put under vacuum. The ferrierite mixture was heated to 120° C. and held at that temperature for approximately 50 minutes. The mixture was then heated to 500° C. and held for approximately 1 hour. The cobalt-exchanged ferrierite was cooled to room temperature under vacuum before being removed from the tube. The cobalt ferrierite was then washed with a series of three aliquots of deionized water and finally dried at 110° C. overnight. Elemental analysis of the cobalt-exchanged ferrierite material showed that the content of cobalt was 1.65 weight percent based on the total weight of cobalt-exchanged ferrierite material. The ratio of Si:Al was analyzed as 10.4 and the ratio of Al:Co was analyzed as 4.7.

TABLE 2

Percentage of $NO_X$ conversion at various catalyst temperatures for Zeolyst ferrierite versus variations in cobalt composition, pre-treatment conditions and cobalt exchange conditions. The pre-treatment was two washes with 0.1M ammonium fluoride at room temperature, and the cobalt treatment was two exchanges with 0.01M cobalt acetate at room temperature, unless otherwise noted.

|  | 200° C. | 250° C. | 300° C. | 350° C. | 400° C. | 450° C. | Varied Conditions and Cobalt Composition |
|---|---|---|---|---|---|---|---|
| Run 8 | 100 | 100 | 95 | 87 | 85 | 87 | No pre-treatment (0.061 wt % Co) |
| Run 9 | 100 | 100 | 90 | 82 | 75 | 85 | Manganese, no pre-treatment (0.077 wt % Mn) |
| Run 10 | 100 | 100 | 92 | 80 | 65 | 57 | (0.023 wt % Co) |

TABLE 2-continued

Percentage of $NO_x$ conversion at various catalyst temperatures for Zeolyst ferrierite versus variations in cobalt composition, pre-treatment conditions and cobalt exchange conditions. The pre-treatment was two washes with 0.1M ammonium fluoride at room temperature, and the cobalt treatment was two exchanges with 0.01M cobalt acetate at room temperature, unless otherwise noted.

|  | 200° C. | 250° C. | 300° C. | 350° C. | 400° C. | 450° C. | Varied Conditions and Cobalt Composition |
|---|---|---|---|---|---|---|---|
| Run 11 | 92 | 98 | 92 | 75 | 65 | 52 | 60° C. Co exchange |
| Run 12 | 97 | 98 | 95 | 65 | 50 | 45 | 60° C. $NH_4F$ washes (0.095 wt % Co) |
| Run 13 | 85 | 90 | 85 | 75 | 65 | 60 | 60° C. Co exchange, 60° C. $NH_4F$ washes (0.29 wt % Co) |
| Run 14 | 98 | 100 | 98 | 90 | 85 | 70 | No pre-treatment, solid-state Co exchange (1.65 wt % Co) |

The results of Table 2 indicate that high cobalt loading is not necessary for high $NO_x$ conversion with the Zeolyst ferrierite material and that loadings of less than 0.1 wt % can provide high $NO_x$ conversion. In addition, Runs 8 and 9 demonstrate that high $NO_x$ conversion can be obtained without any pre-treatment.

EXAMPLE 15a

Approximately 10 grams of Tosoh ferrierite was added to 100 mL of a 1M ammonium fluoride solution. The mixture was stirred for 24 hours at room temperature. The mixture was then centrifuged and the supernatant was discarded. The ferrierite was then washed with a series of three aliquots of deionized water and dried at 110° C. overnight. The dried ferrierite material was finally calcined under flowing dry air for 10 hours at 600° C. Approximately 5 grams of the calcined ferrierite material was added to 200 mL of a 0.01M cobalt (II) acetate solution and stirred for 24 hours at room temperature. The mixture was centrifuged, the supernatant was discarded, and another 200 mL portion of the cobalt (II) acetate solution was added to the ferrierite. This mixture was stirred for 24 hours at room temperature, then centrifuged, and the supernatant was again discarded. The cobalt-exchanged ferrierite was then washed with a series of three aliquots of deionized water and dried at 110° C. overnight.

EXAMPLE 15b

Preparation was the same as Example 15a with the difference that the ammonium fluoride solution was 0.1M and there were two separate ammonium fluoride washes.

EXAMPLE 16a

Approximately 10 grams of Tosoh ferrierite was added to 100 mL of a 1M ammonium chloride solution. The mixture was stirred for 24 hours at room temperature. The mixture was then centrifuged and the supernatant was discarded. The ferrierite was then washed with a series of three aliquots of deionized water and dried at 110° C. overnight. The dried ferrierite material was finally calcined under flowing dry air for 10 hours at 600° C. Approximately 5 grams of the calcined ferrierite material was added to 200 mL of a 0.01M cobalt (II) acetate solution and stirred for 24 hours at room temperature. The mixture was centrifuged, the supernatant was discarded, and another 200 mL portion of the cobalt (II) acetate solution was added to the ferrierite. This mixture was stirred for 24 hours at room temperature, then centrifuged, and the supernatant was again discarded. The cobalt-exchanged ferrierite was then washed with a series of three aliquots of deionized water and dried at 110° C. overnight.

EXAMPLE 16b

Preparation was the same as Example 16a with the difference that the ammonium chloride solution was 0.1M and there were two separate ammonium fluoride washes.

EXAMPLE 17a

Approximately 10 grams of Tosoh ferrierite was added to 100 mL of a 1M ammonium nitrate solution. The mixture was stirred for 24 hours at room temperature. The mixture was then centrifuged and the supernatant was discarded. The ferrierite was then washed with a series of three aliquots of deionized water and dried at 110° C. overnight. The dried ferrierite material was finally calcined under flowing dry air for 10 hours at 600° C. Approximately 5 grams of the calcined ferrierite material was added to 200 mL of a 0.01M cobalt (II) acetate solution and stirred for 24 hours at room temperature. The mixture was centrifuged, the supernatant was discarded, and another 200 mL portion of the cobalt (II) acetate solution was added to the ferrierite. This mixture was stirred for 24 hours at room temperature, then centrifuged, and the supernatant was again discarded. The cobalt-exchanged ferrierite was then washed with a series of three aliquots of deionized water and dried at 110° C. overnight.

EXAMPLE 17b

Preparation was the same as Example 17a with the difference that the ammonium nitrate solution was 0.1M and there were two separate ammonium fluoride washes.

TABLE 3

Percentage of NO$_X$ Conversion at Various Catalyst Temperatures for Tosoh ferrierite versus variations in wash composition (NH$_4$F versus other NH$_4^+$ salts) where the pre-treatment was one 24-hour wash with the 1.0M NH$_4^+$ salt at room temperature and two 24-hour washes with the 0.1M NH$_4^+$ salt.

|         | 200° C. | 250° C. | 300° C. | 350° C. | 400° C. | 450° C. | Salt |
|---------|---------|---------|---------|---------|---------|---------|------|
| Run 15a | 92      | 95      | 98      | 90      | 80      | 75      | NH$_4$F |
| Run 15b | 95      | 97      | 92      | 80      | 65      | 52      | NH$_4$F |
| Run 16a | 82      | 87      | 85      | 75      | 60      | 50      | NH$_4$Cl |
| Run 16b | 90      | 90      | 82      | 67      | 65      | 65      | NH$_4$Cl |
| Run 17a | 100     | 100     | 95      | 90      | 80      | 70      | NH$_4$NO$_3$ |
| Run 17b | 92      | 95      | 87      | 60      | 30      | 15      | NH$_4$NO$_3$ |

The results of Table 3 demonstrate that pretreatment with the fluoride anion yielded a broader conversion window than the nitrate anion. Also, the results suggest that lower pre-treatment concentrations may be preferable for some ionic species.

EXAMPLE 18

Approximately 10 grams of Tosoh ferrierite was added to 100 mL of a 0.5M ammonium fluoride solution. The mixture was stirred for 4 hours at room temperature. The mixture was then centrifuged and the supernatant was discarded. The ferrierite was then washed with a series of three aliquots of deionized water and dried at 110° C. overnight. The dried ferrierite material was finally calcined under flowing dry air for 10 hours at 600° C. Approximately 5 grams of the calcined ferrierite material was added to 200 mL of a 0.01M cobalt (II) acetate solution and stirred for 24 hours at room temperature. The mixture was centrifuged, the supernatant was discarded, and another 200 mL portion of the cobalt (II) acetate solution was added to the ferrierite. This mixture was stirred for 24 hours at room temperature, then centrifuged, and the supernatant was again discarded. The cobalt-exchanged ferrierite was then washed with a series of three aliquots of deionized water and dried at 110° C. overnight.

EXAMPLE 19

Approximately 10 grams of Tosoh ferrierite was added to 100 mL of a 0.5M oxalic acid solution. The mixture was stirred for 4 hours at room temperature. The mixture was then centrifuged and the supernatant was discarded. The ferrierite was then washed with a series of three aliquots of deionized water and dried at 110° C. overnight. The dried ferrierite material was finally calcined under flowing dry air for 10 hours at 600° C. Approximately 5 grams of the calcined ferrierite material was added to 200 mL of a 0.01M cobalt (II) acetate solution and stirred for 24 hours at room temperature. The mixture was centrifuged, the supernatant was discarded, and another 200 mL portion of the cobalt (II) acetate solution was added to the ferrierite. This mixture was stirred for 24 hours at room temperature, then centrifuged, and the supernatant was again discarded. The cobalt-exchanged ferrierite was then washed with a series of three aliquots of deionized water and dried at 110° C. overnight.

EXAMPLE 20

Approximately 10 grams of Tosoh ferrierite was added to 100 mL of a 0.5M nitric acid solution. The mixture was stirred for 4 hours at room temperature. The mixture was then centrifuged and the supernatant was discarded. The ferrierite was then washed with a series of three aliquots of deionized water and dried at 110° C. overnight. The dried ferrierite material was finally calcined under flowing dry air for 10 hours at 600° C. Approximately 5 grams of the calcined ferrierite material was added to 200 mL of a 0.01M cobalt (II) acetate solution and stirred for 24 hours at room temperature. The mixture was centrifuged, the supernatant was discarded, and another 200 mL portion of the cobalt (II) acetate solution was added to the ferrierite. This mixture was stirred for 24 hours at room temperature, then centrifuged, and the supernatant was again discarded. The cobalt-exchanged ferrierite was then washed with a series of three aliquots of deionized water and dried at 110° C. overnight.

EXAMPLE 21

Approximately 10 grams of Tosoh ferrierite was added to 100 mL of a 0.5M hydrochloric acid solution. The mixture was stirred for 4 hours at room temperature. The mixture was then centrifuged and the supernatant was discarded. The ferrierite was then washed with a series of three aliquots of deionized water and dried at 110° C. overnight. The dried ferrierite material was finally calcined under flowing dry air for 10 hours at 600° C. Approximately 5 grams of the calcined ferrierite material was added to 200 mL of a 0.01M cobalt (II) acetate solution and stirred for 24 hours at room temperature. The mixture was centrifuged, the supernatant was discarded, and another 200 mL portion of the cobalt (II) acetate solution was added to the ferrierite. This mixture was stirred for 24 hours at room temperature, then centrifuged, and the supernatant was again discarded. The cobalt-exchanged ferrierite was then washed with a series of three aliquots of deionized water and dried at 110° C. overnight.

TABLE 4

Percentage of $NO_X$ Conversion at Various Catalyst Temperatures for Tosoh ferrierite versus variations in wash composition ($NH_4F$ versus acids) where the pre-treatment was one 4-hour wash with the 0.5M $NH_4F$ or acid at room temperature

| | 200° C. | 250° C. | 300° C. | 350° C. | 400° C. | 450° C. | Varied Conditions |
|---|---|---|---|---|---|---|---|
| Run 18 | 100 | 100 | 95 | 85 | 75 | 70 | $NH_4F$ |
| Run 19 | 40 | 55 | 67 | 70 | 85 | 98 | Oxalic acid |
| Run 20 | 70 | 85 | 90 | 90 | 85 | 95 | $HNO_3$ |
| Run 21 | 55 | 72 | 82 | 80 | 90 | 100 | HCl |

The results of Table 4 demonstrate that $NO_x$ conversion is substantially better for pre-treatment with ammonium fluoride for the low temperature ranges of 200° C. to 300° C.

EXAMPLE 22

Comparative Example—Prior Art

Example 4 of Hansel, U.S. Pat. No. 5,524,432 was prepared for comparison to the compositions of matter of the present invention. Approximately 15 grams of Tosoh ferrierite was added to 180 mL of a 1.0M ammonium nitrate solution. The mixture was stirred for 24 hours at room temperature. The mixture was centrifuged, the supernatant was discarded, and another 180 mL of the ammonium nitrate solution was added to the ferrierite. The mixture was again stirred for 24 hours at room temperature, centrifuged and decanted. A third ammonium nitrate wash was performed similarly. The ferrierite was then washed once with 1L of deionized water and dried at 110° C. overnight. Approximately 10 grams of the dried ferrierite material was added to 500 mL of deionized water. This solution was added to a solution of 500 mL of deionized water and 4 grams of cobalt (II) acetate tetrahydrate. The mixture was heated to 80° C. and stirred for 24 hours. The mixture was centrifuged and the supernatant was discarded. The ferrierite material was again mixed with 500 mL of deionized water and added to another 500 mL of the cobalt (II) acetate solution. The mixture was again heated to 80° C., stirred for 24 hours, centrifuged and decanted. The cobalt-exchanged ferrierite was then washed once with 1L of deionized water and dried at 110° C. overnight.

Figure 1B:
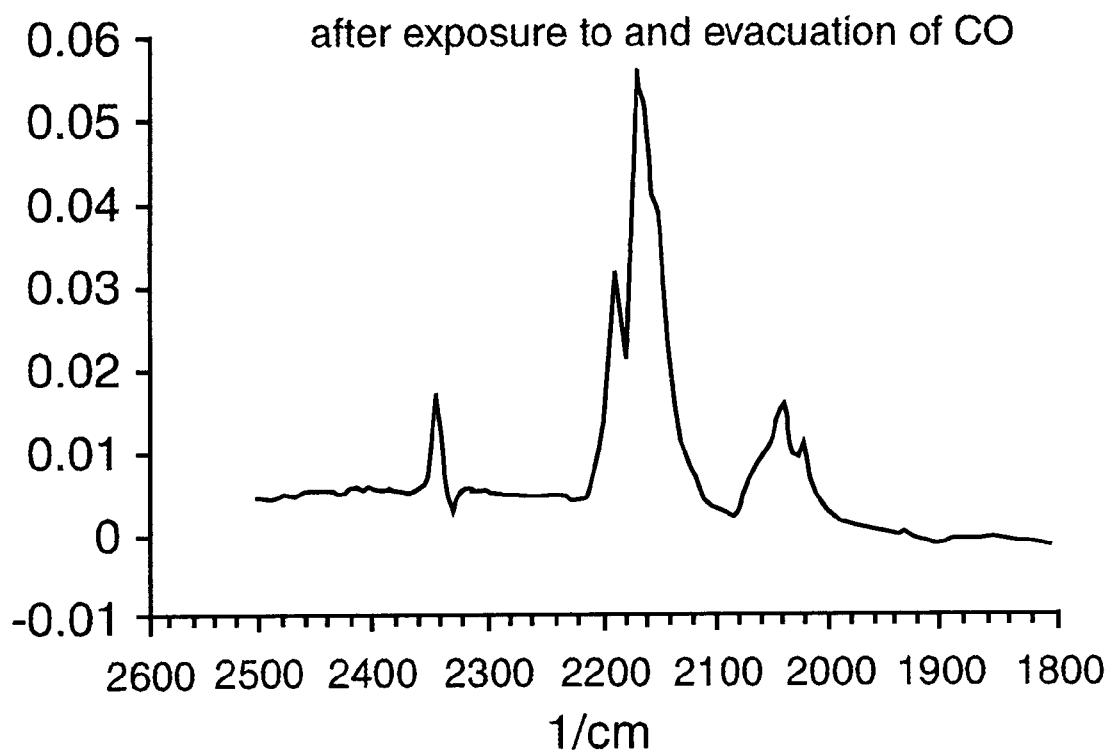

IR measurements of this final product prepared in accordance with Hansel were taken. FIG. 1(a) shows the IR spectra of the material under 1 Torr of NO at room temperature. FIG. 1(b) shows the IR spectra of the material after exposure to CO and subsequent evacuation of CO at a temperature of 120 K. Peak positions and relative intensities are shown in Table [8]9.

EXAMPLE 23

Approximately 15 grams of Tosoh ferrierite was added to 180 mL of a 1.0M ammonium fluoride solution. The mixture was stirred for 24 hours at room temperature. The mixture was centrifuged, the supernatant was discarded, and another 180 mL of the ammonium fluoride solution was added to the ferrierite. The mixture was again stirred for 24 hours at room temperature, centrifuged and decanted. A third ammonium fluoride wash was performed similarly. The ferrierite was then washed once with 1L of deionized water and dried at 110° C. overnight. Approximately 10 grams of the dried ferrierite material was added to 500 mL of deionized water. This solution was added to a solution of 500 mL of deionized water and 4 grams of cobalt (I) acetate tetrahydrate. The mixture was heated to 80° C. and stirred for 24 hours. The mixture was centrifuged and the supernatant was discarded. The ferrierite material was again mixed with 500 mL of deionized water and added to another 500 mL of the cobalt (II) acetate solution. The mixture was again heated to 80° C., stirred for 24 hours, centrifuged and decanted. The cobalt-exchanged ferrierite was then washed once with 1L of deionized water and dried at 110° C. overnight.

EXAMPLE 24

Approximately 15 grams of Tosoh ferrierite was added to 180 mL of a 1.0M ammoniun nitrate solution. The mixture was stirred for 24 hours at room temperature. The mixture was centrifuged, the supernatant was discarded, and another 180 mL of the ammonium nitrate solution was added to the ferrierite. The mixture was again stirred for 24 hours at room temperature, centrifuged and decanted. A third ammonium nitrate wash was performed similarly. The ferrierite was then washed with a series of three aliquots of deionized water and dried at 110° C. overnight. Approximately 5 grams of the dried ferrierite material was added to 200 mL of a 0.01M cobalt (II) acetate solution and stirred for 24 hours at room temperature. The mixture was centrifuged, the supernatant was discarded, and another 200 mL of the cobalt (II) acetate solution was added to the ferrierite. The mixture was again stirred for 24 hours at room temperature, centrifuged and decanted. The cobalt-exchanged ferrierite was then washed with a series of three aliquots of deionized water and dried at 110° C. overnight.

EXAMPLE 25

Approximately 15 grams of Tosoh ferrierite was added to 180 mL of a 1.0M ammonium nitrate solution. The mixture was stirred for 24 hours at room temperature. The mixture was centrifuged, the supernatant was discarded, and another 180 mL of the ammonium nitrate solution was added to the ferrierite. The mixture was again stirred for 24 hours at room temperature, centrifuged and decanted. A third ammonium nitrate wash was performed similarly. The ferrierite was then washed with a series of three aliquots of deionized water and dried at 110° C. overnight. The dried ferrierite was calcined under dry flowing air for 10 hours at 600° C. Approximately 5 grams of the calcined ferrierite material was added to 200 mL of a 0.01M cobalt (II) acetate solution and stirred for 24 hours at room temperature. The mixture was centrifuged, the supernatant was discarded, and another 200 mL of the cobalt (II) acetate solution was added to the ferrierite. The mixture was again stirred for 24 hours at room temperature, centrifuged and decanted. The cobalt-exchanged ferrierite was then washed with a series of three aliquots of deionized water and dried at 110° C. overnight.

TABLE 5

Percentage of $NO_x$ conversion at various catalyst temperatures for Tosoh ferrierite versus variations in pre-treatment and cobalt exchange.

| | 200° C. | 250° C. | 300° C. | 350° C. | 400° C. | 450° C. | |
|---|---|---|---|---|---|---|---|
| Run 22 | 50 | 82 | 100 | 95 | 85 | 70 | $NH_4NO_3$ washed, uncalcined, 80° C. Co exchange |
| Run 23 | 47 | 80 | 100 | 100 | 100 | 85 | $NH_4F$ washed, uncalcined, 80° C. Co exchange |
| Run 24 | 70 | 75 | 65 | 57 | 57 | 57 | $NH_4NO_3$ washed, uncalcined, room temp. Co exchange |
| Run 25 | 97 | 100 | 95 | 57 | 35 | 25 | $NH_4NO_3$ washed, calcined, room temp. Co exchange |

The results of Table 5 demonstrate that calcination as in Run 25 is generally better for low temperature activity at 300° C. or lower. Also, Run 23 shows a broad $NO_x$ reduction window.

Examples 26–31 compare the performance of catalysts prepared with the metals of cobalt, gallium and indium.

EXAMPLE 26

Approximately 5 grams of Zeolyst ferrierite material was added to 200 mL of a 0.01M cobalt (II) nitrate solution and stirred for 24 hours at room temperature. The mixture was centrifuged, the supernatant was discarded, and another 200 mL portion of the 0.01M cobalt (II) nitrate solution was added to the ferrierite material. The mixture was again stirred for 24 hours, centrifuged, and decanted. The cobalt-exchanged ferrierite was then washed with a series of three aliquots of deionized water and dried at 110° C. overnight.

EXAMPLE 27

Approximately 5 grams of Zeolyst ferrierite material was added to 200 mL of a 0.01M gallium (III) nitrate solution and stirred for 24 hours at room temperature. The mixture was centrifuged, the supernatant was discarded, and another 200 mL portion of the 0.01M gallium (III) nitrate solution was added to the ferrierite material. The mixture was again stirred for 24 hours, centrifuged, and decanted. The cobalt-exchanged ferrierite was then washed with a series of three aliquots of deionized water and dried at 110° C. overnight.

EXAMPLE 28

Approximately 5 grams of Zeolyst ferrierite material was added to 200 mL of a 0.01M indium (III) nitrate solution and stirred for 24 hours at room temperature. The mixture was centrifuged, the supernatant was discarded, and another 200 mL portion of the 0.01M indium (III) nitrate solution was added to the ferrierite material. The mixture was again stirred for 24 hours, centrifuged, and decanted. The cobalt-exchanged ferrierite was then washed with a series of three aliquots of deionized water and dried at 110° C. overnight.

EXAMPLE 29

Approximately 5 grams of Zeolyst ferrierite material was added to 200 mL of a 0.01M cobalt (II) nitrate/0.01M gallium (III) nitrate solution and stirred for 24 hours at room temperature. The mixture was centrifuged, the supernatant was discarded, and another 200 mL portion of the 0.01M cobalt (II) nitrate/0.01M gallium (III) nitrate solution was added to the ferrierite material. The mixture was again stirred for 24 hours, centrifuged, and decanted. The cobalt/gallium-exchanged ferrierite was then washed with a series of three aliquots of deionized water and dried at 110° C. overnight.

EXAMPLE 30

Approximately 5 grams of Zeolyst ferrierite material was added to 200 mL of a 0.01M cobalt (II) nitrate/0.01M indium (III) nitrate solution and stirred for 24 hours at room temperature. The mixture was centrifuged, the supernatant was discarded, and another 200 mL portion of the 0.01M cobalt (II) nitrate/0.01M indium (III) nitrate solution was added to the ferrierite material. The mixture was again stirred for 24 hours, centrifuged, and decanted. The cobalt/indium-exchanged ferrierite was then washed with a series of three aliquots of deionized water and dried at 110° C. overnight.

EXAMPLE 31

Approximately 5 grams of Zeolyst ferrierite material was added to 200 mL of a 0.01M cobalt (II) nitrate/0.01M gallium (III) nitrate/0.01M indium (III) nitrate solution and stirred for 24 hours at room temperature. The mixture was centrifuged, the supernatant was discarded, and another 200 mL portion of the 0.01M cobalt (II) nitrate/0.01M gallium (III) nitrate/0.01M indium (III) nitrate solution was added to the ferrierite material. The mixture was again stirred for 24 hours, centrifuged, and decanted. The cobalt/gallium/indium-exchanged ferrierite was then washed with a series of three aliquots of deionized water and dried at 110° C. overnight.

TABLE 6

Percentage of $NO_x$ conversion at various catalyst temperatures for Zeolyst ferrierite versus metal ion. No pre-treatment was performed on the Zeolyst ferrierite.

| | 200° C. | 250° C. | 300° C. | 350° C. | 400° C. | 450° C. | 500° C. | 600° C. | metal |
|---|---|---|---|---|---|---|---|---|---|
| Run 26 | 100 | 100 | 95 | 60 | 45 | 37 | 37 | 37 | Co |
| Run 27 | 100 | 100 | 100 | 100 | 95 | 95 | 95 | 47 | Ga |
| Run 28 | 97 | 100 | 100 | 100 | 100 | 100 | 100 | 80 | In |
| Run 29 | 100 | 100 | 100 | 95 | 95 | 100 | 100 | 100 | Co, Ga |
| Run 30 | 100 | 100 | 100 | 95 | 100 | 100 | 95 | 45 | Co, In |
| Run 31 | 100 | 100 | 100 | 100 | 100 | 100 | 100 | 80 | Co, Ga, In |

The results of Table 6 show the broad $NO_x$ reduction window of Runs 27–31.

EXAMPLE 32

Approximately 5 grams of Tosoh ferrierite material was added to 200 mL of a 0.01M cobalt (II) nitrate solution and stirred for 24 hours at room temperature. The mixture was centrifuged, the supernatant was discarded, and another 200 mL portion of the 0.01M cobalt (II) nitrate solution was added to the ferrierite material. The mixture was again stirred for 24 hours, centrifuged, and decanted. The cobalt-exchanged ferrierite was then washed with a series of three aliquots of deionized water and dried at 110° C. overnight.

EXAMPLE 33

Approximately 5 grams of Tosoh ferrierite material was added to 200 mL of a 0.01M cobalt (II) nitrate/0.01M gallium (III) nitrate solution and stirred for 24 hours at room temperature. The mixture was centrifuged, the supernatant was discarded, and another 200 mL portion of the 0.01M cobalt (II) nitrate/gallium (III) nitrate solution was added to the ferrierite material. The mixture was again stirred for 24 hours, centrifuged, and decanted. The cobalt -exchanged ferrierite was then washed with a series of three aliquots of deionized water and dried at 110° C. overnight.

EXAMPLE 34

Approximately 5 grams of Tosoh ferrierite material was added to 200 mL of a 0.01M cobalt (II) nitrate/0.01M indium (III) nitrate solution and stirred for 24 hours at room temperature. The mixture was centrifuged, the supernatant was discarded, and another 200 mL portion of the 0.01M cobalt (II) nitrate/indium (III) nitrate solution was added to the ferrierite material. The mixture was again stirred for 24 hours, centrifuged, and decanted. The cobalt-exchanged ferrierite was then washed with a series of three aliquots of deionized water and dried at 110° C. overnight.

EXAMPLE 35

Approximately 5 grams of Tosoh ferrierite material was added to 200 mL of a 0.01M cobalt (II) nitrate/0.01M gallium (III) nitrate/0.01M indium (III) nitrate solution and stirred for 24 hours at room temperature. The mixture was centrifuged, the supernatant was discarded, and another 200 mL portion of the 0.01M cobalt (II) nitrate/gallium (III) nitrate/indium (III) nitrate solution was added to the ferrierite material. The mixture was again stirred for 24 hours, centrifuged, and decanted. The cobalt-exchanged ferrierite was then washed with a series of three aliquots of deionized water and dried at 110° C. overnight.

EXAMPLE 36

Approximately 20 grams of Tosoh ferrierite was added to 200 mL of a 0.1M ammonium fluoride solution and stirred for 24 hours at room temperature. The mixture was centrifuged, the supernatant was discarded, and another 200 mL of the ammonium fluoride solution was added to the ferrierite. The mixture was again stirred for 24 hours at room temperature, centrifuged and decanted. The ferrierite material was then washed with a series of three aliquots of deionized water and dried at 110° C. overnight. The ferrierite was calcined under dry flowing air for 6 hours at 600° C. Approximately 5 grams of the calcined ferrierite material was added to 200 mL of a 0.01M cobalt (II) nitrate solution and stirred for 24 hours at room temperature. The mixture was centrifuged, the supernatant was discarded, and another 200 mL portion of the 0.01M cobalt (II) nitrate solution was added to the ferrierite material. The mixture was again stirred for 24 hours, centrifuged, and decanted. The cobalt-exchanged ferrierite was then washed with a series of three aliquots of deionized water and dried at 110° C. overnight.

EXAMPLE 37

Approximately 20 grams of Tosoh ferrierite was added to 200 mL of a 0.1M ammonium fluoride solution and stirred for 24 hours at room temperature. The mixture was centrifuged, the supernatant was discarded, and another 200 mL of the ammonium fluoride solution was added to the ferrierite. The mixture was again stirred for 24 hours at room temperature, centrifuged and decanted. The ferrierite material was then washed with a series of three aliquots of deionized water and dried at 110° C. overnight. Approximately 5 grams of the dried ferrierite material was added to 200 mL of a 0.01M cobalt (II) nitrate/0.01M gallium (III) nitrate solution and stirred for 24 hours at room temperature. The mixture was centrifuged, the supernatant was discarded, and another 200 mL portion of the 0.01M cobalt (II) nitrate/0.01M gallium (III) nitrate solution was added to the ferrierite material. The mixture was again stirred for 24 hours, centrifuged, and decanted. The cobalt/gallium-exchanged ferrierite was then washed with a series of three aliquots of deionized water and dried at 110° C. overnight.

EXAMPLE 38

Approximately 20 grams of Tosoh ferrierite was added to 200 mL of a 0.1M ammonium fluoride solution and stirred for 24 hours at room temperature. The mixture was centrifuged, the supernatant was discarded, and another 200 mL of the ammonium fluoride solution was added to the ferrierite. The mixture was again stirred for 24 hours at room temperature, centrifuged and decanted. The ferrierite material was then washed with a series of three aliquots of deionized water and dried at 110° C. overnight. Approximately 5 grams of the dried ferrierite material was added to 200 mL of a 0.01M cobalt (II) nitrate/0.01M indium (III) nitrate solution and stirred for 24 hours at room temperature. The mixture was centrifuged, the supernatant was discarded, and another 200 mL portion of the 0.01M cobalt (II) nitrate/0.01M indium (III) nitrate solution was added to the ferrierite material. The mixture was again stirred for 24 hours, centrifuged, and decanted. The cobalt/indium-exchanged ferrierite was then washed with a series of three aliquots of deionized water and dried at 110° C. overnight.

EXAMPLE 39

Approximately 20 grams of Tosoh ferrierite was added to 200 mL of a 0.1M ammonium fluoride solution and stirred for 24 hours at room temperature. The mixture was centrifuged, the supernatant was discarded, and another 200 mL of the ammonium fluoride solution was added to the ferrierite. The mixture was again stirred for 24 hours at room temperature, centrifuged and decanted. The ferrierite material was then washed with a series of three aliquots of deionized water and dried at 110° C. overnight. Approximately 5 grams of the dried ferrierite material was added to 200 mL of a 0.01M cobalt (II) nitrate/0.01M indium (III) nitrate/0.01M indium (III) nitrate solution and stirred for 24 hours at room temperature. The mixture was centrifuged, the supernatant was discarded, and another 200 mL portion of the 0.01M cobalt (II) nitrate/0.01M indium (III) nitrate/ 0.01M indium (III) nitrate solution was added to the ferrierite material. The mixture was again stirred for 24 hours, centrifuged, and decanted. The cobalt/gallium/indium-exchanged ferrierite was then washed with a series of three aliquots of deionized water and dried at 110° C. overnight.

It should be noted that the calcining step was not found necessary with Ga or In materials, whereas it was important with the Co-FER materials.

The results of Table 6 show the broad $NO_x$ reduction window of Runs 33–39.

Catalytic screening was conducted with and without a supported platinum cagtalyst bed directly downstream of the catalyst bed of the present invention. The platinum catalyst bed serves to completely react partially reduced nitrogen-containing species in order to obtain a $NO_x$ conversion to $N_2$.

EXAMPLE 40

Cobalt Ferrierite (Zeolyst)

Approximately 5 grams of Zeolyst ferrierite material was added to 200 mL of a 0.1M cobalt (II) acetate solution and stirred for 24 hours at room temperature. The mixture was centrifuged, the supernatant was discarded, and another 200 mL portion of the 0.1M cobalt (II) acetate solution was added to the ferrierite material. The mixture was again stirred for 24 hours, centrifuged, and decanted. The cobalt-exchanged ferrierite was then washed with a series of three aliquots of deionized water and dried at 110° C. overnight.

EXAMPLE 41

Cobalt Ferrierite (Zeolyst) with Supported Platinum Catalyst

In the catalyst testing apparatus, a supported platinum catalyst (obtained from Johnson-Matthey) was sieved and placed in the quartz tube reactor directly downstream of the ferrierite catalyst bed (example 40). Testing of the catalytic activity was carried out as in all other experiments.

EXAMPLE 42

Cobalt Gallium Ferrierite (Zeolyst)

The material from Example 29 was tested for catalytic activity.

TABLE 7

Percentage of $NO_X$ conversion at various catalyst temperatures for Tosoh ferrierite versus metal ion. Pre-treatment of the ferrierite was two 0.1M ammonium fluoride washes, unless otherwise noted.

|  | 200° C. | 250° C. | 300° C. | 350° C. | 400° C. | 450° C. | 500° C. | 600° C. |  |
|---|---|---|---|---|---|---|---|---|---|
| Run 32 | 15 | 25 | 37 | 32 | 35 | 52 | 45 | 15 | No pre-treatment, Co |
| Run 33 | 92 | 97 | 100 | 100 | 85 | 70 | 52 | 42 | No pre-treatment, Co and Ga |
| Run 34 | 67 | 75 | 90 | 100 | 82 | 75 | 82 | 57 | No pre-treatment, Co and In |
| Run 35 | 87 | 92 | 100 | 100 | 100 | 100 | 100 | 85 | No pre-treatment, Co, Ga and In |
| Run 36 | 97 | 100 | 95 | 82 | 70 | 60 | 55 | 40 | Co |
| Run 37 | 100 | 100 | 100 | 100 | 100 | 100 | 100 | 92 | Co, Ga |
| Run 38 | 95 | 100 | 100 | 100 | 100 | 100 | 100 | 60 | Co, In |
| Run 39 | 100 | 100 | 100 | 100 | 100 | 100 | 100 | 80 | Co, Ga, In |

EXAMPLE 43

Cobalt Gallium Ferrierite+Supported Platinum Catalyst

In the catalyst testing apparatus, a supported platinum catalyst (obtained from Johnson-Matthey) was sieved and placed in the quartz tube reactor directly downstream of the ferrierite catalyst bed of example 42. Testing of the catalytic activity was carried out as in all other experiments.

TABLE 8

Percentage of $NO_x$ conversion at various catalyst temperatures for Zeolyst ferrierite with and without a supported platinum catalyst bed directly downstream of the ferrierite catalyst bed.

|  | 200° C. | 250° C. | 300° C. | 350° C. | 400° C. | 450° C. | 500° C. | 600° C. |  |
|---|---|---|---|---|---|---|---|---|---|
| Run 40 | 100 | 100 | 95 | 85 | 80 | 82 | 82 | 65 | Co, without Pt bed |
| Run 41 | 100 | 100 | 85 | 60 | 47 | 40 | 35 | 27 | Co, with Pt bed |
| Run 42 | 100 | 100 | 100 | 95 | 95 | 100 | 100 | 100 | Co and Ga, without Pt bed |
| Run 43 | 100 | 100 | 100 | 100 | 95 | 95 | 97 | 50 | Co and Ga, with Pt bed |

The results of Table 8 show that the combination of Co and Ga of Runs 42 and 43 exhibit greater selectivity to $NO_x$ conversion at lower temperatures than Co alone and with broader operating windows.

IR measurements for NO and CO adsorption data was conducted on material from example 22 (prior art), material from example 10 and a material prepared in the manner of example 8. The various spectra are shown in FIG. 1(a–f). Table [8]9 shows the various peak positions and relative intensities from the figures.

TABLE 9

Figure 1C:
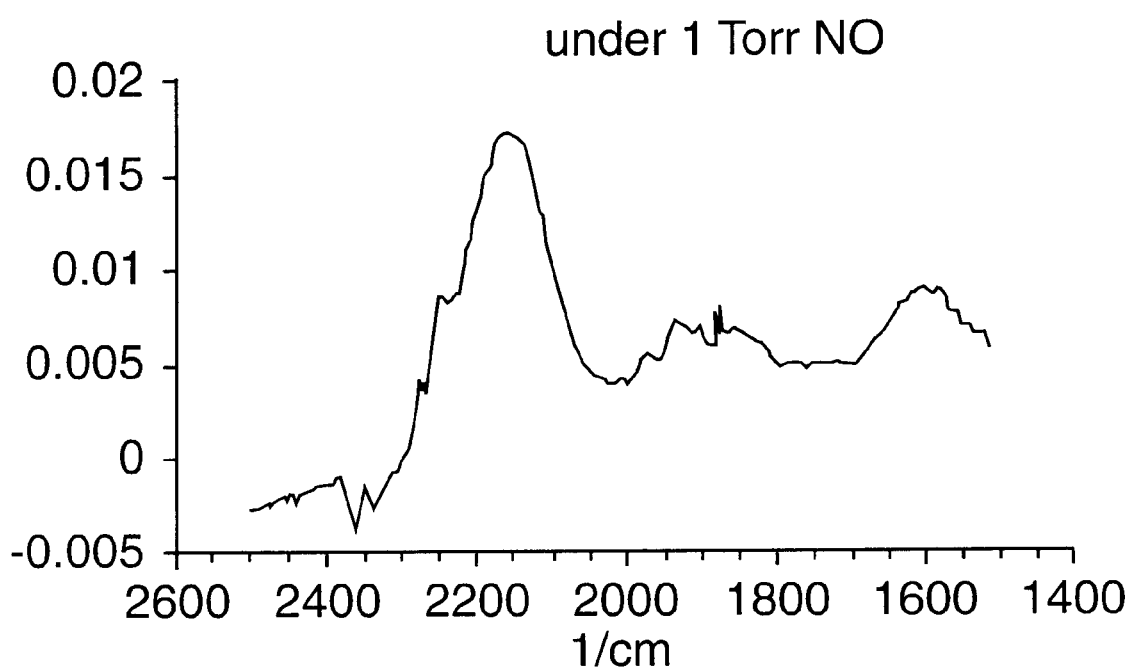
Figure 1D:
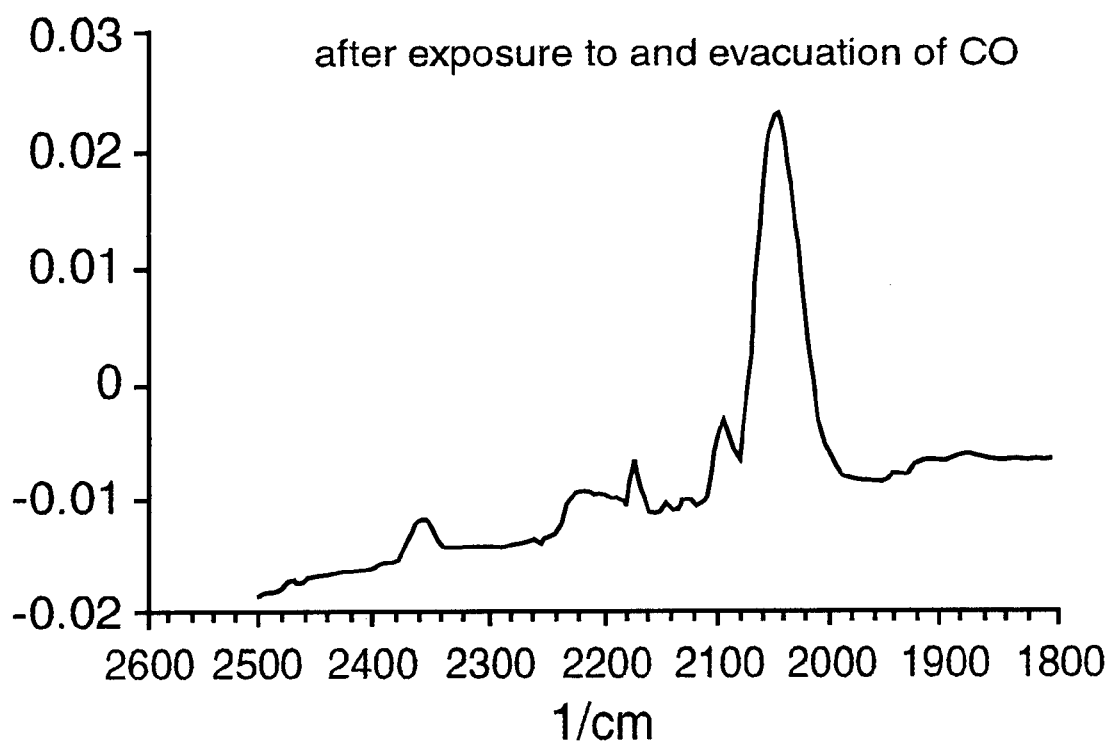
Figure 1E:
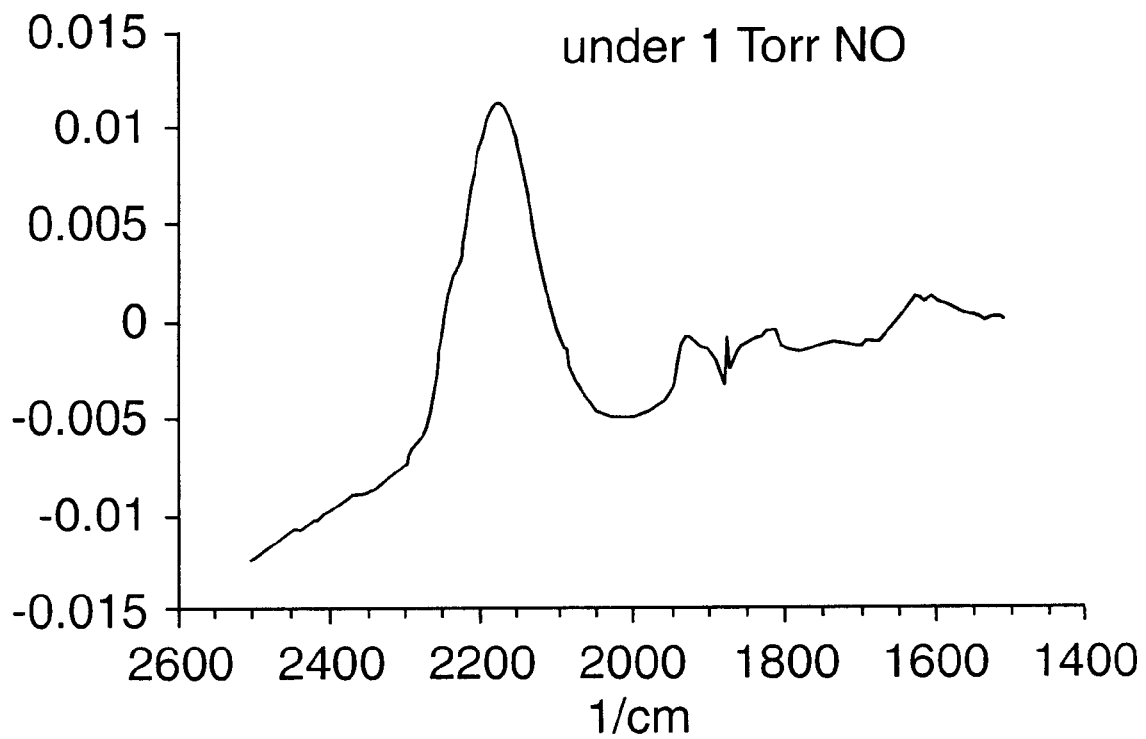
Figure 1F:
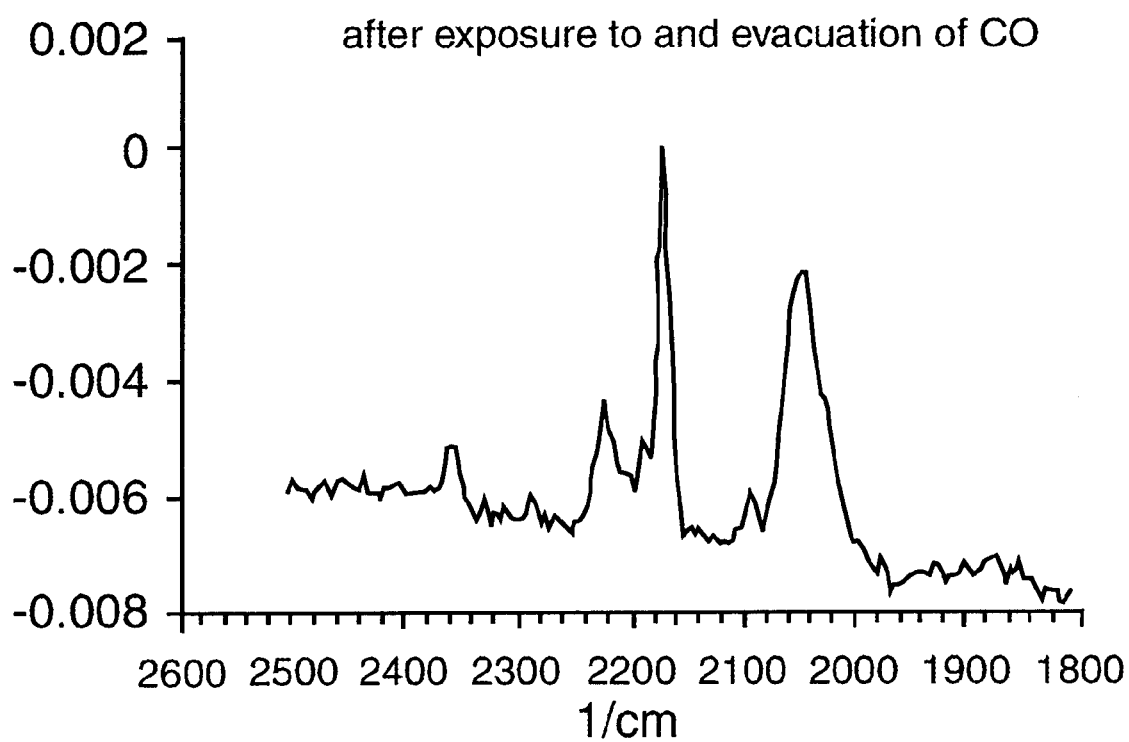

| Sample | NO Under 1 Torr at Room Temperature | | After Exposure to and Evacuation of CO at 120K | |
|---|---|---|---|---|
|  | Peak Position | Relative Intensity | Peak Position | Relative Intensity |
| Example 22 (prior art) FIGS. 1a and 1b | 2175 | 0.53 | 2346 | 0.23 |
|  | 1933 | 0.39 | 2225 | 0.05 |
|  | 1898 | 0.32 | 2190 | 0.53 |
|  | 1813 | 1.00 | 2173 | 1.00 |
|  | 1591 | 0.00 | 2096 | 0.00 |
|  |  |  | 2042 | 0.22 |
| Example 10 FIGS. 1c and 1d | 2169 | 1.00 | 2356 | 0.12 |
|  | 1933 | 0.19 | 2225 | 0.00 |
|  | 1876 | 0.24 | 2190 | 0.00 |
|  | 1813 | 0.00 | 2173 | 0.12 |
|  | 1591 | 0.27 | 2096 | 0.23 |
|  |  |  | 2049 | 1.00 |
| In accordance with Example 8 FIGS. 1e and 1f | 2175 | 1.00 | 2356 | 0.23 |
|  | 1933 | 0.19 | 2225 | 0.35 |
|  | 1876 | 0.19 | 2190 | 0.14 |
|  | 1813 | 0.19 | 2173 | 1.00 |
|  | 1591 | 0.00 | 2096 | 0.15 |
|  |  |  | 2049 | 0.73 |

Substantial differences in the IR spectra between a pretreated Tosoh cobalt ferrierite sample and Zeolyst cobalt ferrierite materials (with either no pre-treatment or with pre-treatment) can be seen with both adsorbed NO and CO. In the NO spectra, the Tosoh material gives a very intense peak at 1813 $cm^{-1}$ and moderately intense peaks at 1933 $cm^{-1}$ and 1898 $cm^{-1}$, whereas these peaks are absent in both of the Zeolyst materials. The CO spectra yield relatively strong and broad peaks at around 2100 $cm^{-1}$ for both Zeolyst materials, and a relatively low intensity peak for the Tosoh material in the same region. Both of the pre-treated materials (Tosoh and Zeolyst) reveal relatively intense peaks in the 2225–2173 $cm^{-1}$ region of the CO spectra. A slight increase in intensity at 2346 $cm^{-1}$ can be seen for the Tosoh material over the Zeolyst materials.

EXAMPLE 44

Approximately 10 grams of Zeolyst ferrierite material was added to 4100 mL of a 0.01M cobalt (II) acetate solution and stirred for 24 hours at room temperature. The mixture was centrifuged, the supernatant was discarded, and another 200 mL portion of the cobalt (II) acetate solution was added to the ferrierite. This mixture was stirred for 24 hours at room temperature, then centrifuged, and the supernatant was again discarded. The cobalt-exchanged ferrierite was then washed with a series of three aliquots of deionized water and dried at 110° C. overnight.

TABLE 10

Ammonia as reductant screening test: replaced mass-flow controlled feed of hydrocarbon and hydrogen with 75 ppm $NH_3$, with and without 5% $H_2O$.

|  | 220° C. | 290° C. | 400° C. | 600° C. | Reductant |
|---|---|---|---|---|---|
| Run 44a | 100 | 100 | 87 | 65 | Hydrocarbon |
| Run 44b | 50 | 55 | 40 | 5 | Ammonia (1:1::$NH_3$:$NO_x$) |
| Run 44c | 20 | 50 | 45 | 0 | Ammonia (1:1::$NH_3$:$NO_x$) with 5% $H_2O$ |

The results of Table 10 demonstrate that ammonia can also serve as a reductant material.

Although the present invention has been described with reference to specific details, it is not intended that such details should be regarded as limitations upon the scope of the invention, except as and to the extent that they are included in the accompanying claims.

What is claimed is:

1. A process for catalytically reducing nitrogen oxides in an exhaust gas stream containing nitrogen oxides and a reductant material comprising:

contacting said gas stream under conditions effective to catalytically reduce said nitrogen oxides with a catalyst comprising an aluminum-silicate material and a metal in an amount of up to about 0.1 weight percent based on total weight of catalyst, said catalyst characterized as having sufficient catalytic activity so as to reduce the nitrogen oxides by at least 60 percent under temperatures within the range of from about 200° C. to about 400° C.

2. The process of claim 1 wherein said exhaust gas stream is characterized as oxygen rich.

3. The process of claim 1 wherein said aluminum-silicate material is characterized as including 10-ring/8-ring zeolite materials or 12-ring/8-ring zeolite materials.

4. The process of claim 3 wherein said aluminum-silicate material is selected from the group consisting of FER, CGF, CGS, DAC, EPI, HEU, MFS, STI, WEN, WEI, AFR, AFS, AFY, BPH, GME, MAZ, MOR, OFF, and SUZ-4.

5. The process of claim 1 wherein said aluminum-silicate material is a ferrierite material.

6. The process of claim 1 wherein said aluminum-silicate material is a ferrierite material further including the metal.

7. The process of claim 1 wherein the metal is selected from the group consisting of cobalt, indium, gallium, manganese and combinations thereof.

* * * * *